(12) United States Patent
Strumpell

(10) Patent No.: US 7,630,120 B2
(45) Date of Patent: Dec. 8, 2009

(54) NON-CONTACTING ELECTROSTATICALLY DRIVEN MEMS DEVICE

(75) Inventor: Mark Strumpell, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/925,577

(22) Filed: Oct. 26, 2007

(65) Prior Publication Data

US 2008/0130079 A1   Jun. 5, 2008

Related U.S. Application Data

(63) Continuation-in-part of application No. 10/907,992, filed on Apr. 22, 2005, now abandoned.

(51) Int. Cl.
   *G02B 26/00* (2006.01)
   *G02B 26/08* (2006.01)
(52) U.S. Cl. ..................... 359/290; 359/225
(58) Field of Classification Search ......... 359/223–225, 359/290–292, 295, 298
See application file for complete search history.

(56) References Cited

U.S. PATENT DOCUMENTS 6,914,711 B2 * 7/2005 Novotny et al. ............. 359/291

* cited by examiner

*Primary Examiner*—William C Choi
(74) *Attorney, Agent, or Firm*—Charles A. Brill; Wade James Brady, III; Frederick J. Telecky, Jr.

(57) ABSTRACT

A microelectromechanical device has a movable first electrode and stationary second and third electrodes oriented parallel with the substrate. The first electrode is separated from the substrate and includes a first hinge oriented parallel to the substrate, with spaced apart extensions extending from opposing sides of the first electrode. The second and third electrodes are fixedly formed on the substrate adjacent to the opposing sides of the first electrode and have spaced apart extensions interspersed with the spaced apart extensions of the first electrode. The first electrode can move substantially parallel to the surface of the substrate such that the extensions of one side of the first electrode substantially overlap the extensions of the second electrode in a first state and the extensions of the other side of the first electrode substantially overlaps the extensions of the third electrode in a second state. A second hinge has one or more first posts fixedly coupled to the substrate and one or more second posts coupled to the first electrode, such that movement of the first electrode causes a twisting of the first and second hinges.

14 Claims, 3 Drawing Sheets

NON-CONTACTING ELECTROSTATICALLY DRIVEN MEMS DEVICE

CROSS-REFERENCE TO RELATED APPLICATIONS

This application is a continuation-in-part of U.S. Ser. No. 10/907,992, filed Apr. 22, 2005, entitled "A Non-Contacting Electrostatically Driven MEMS Device" to Strumpell, which is incorporated by reference herein.

STATEMENT OF FEDERALLY SPONSORED RESEARCH OR DEVELOPMENT

Not Applicable

BACKGROUND OF THE INVENTION

1. Technical Field

This invention relates in general to microelectromechanical system (MEMS) devices and, more particularly, to an electrostatically driven MEMS device.

2. Description of the Related Art

Microelectromechanical systems (MEMS) devices are small structures typically fabricated on a semiconductor wafer using techniques such as optical lithography, doping, metal sputtering, oxide deposition, and plasma etching, which have been developed for the fabrication of integrated circuits. Digital micromirror devices (DMDs), sometimes referred to as deformable micromirror devices, are a type of MEMS device used in projection displays by controlling light through reflection. Other types of MEMS devices include accelerometers, pressure and flow sensors, and gears and motors.

A conventional DMD 100 is illustrated in FIG. 1. As shown, the DMD 100 is constructed of three metal layers: a top layer 102, a middle layer 104, and a bottom layer 106. The three metal layers are situated over an integrated circuit (not shown), which provides electrical commands and signals. The top layer 102 includes a pixel mirror 108 that resides over the middle layer 104 supported via a mirror support post 110. The middle layer 104, in turn, resides over the bottom layer 106 supported by four hinge support posts 112. The mirror support post 110 of the top layer 102 is attached to a yoke 114. As the yoke 114 rotates on its torsion hinges 118, it drives the mirror support post 110 to rotate and tilt accordingly. Consequently, as the mirror support post 110 rotates and tilts, it dictates the angle, direction, and magnitude that the pixel mirror 108 will rotate and tilt. The yoke 114, in essence, controls the pixel mirror 108 by this relay effect.

One problem associated with a conventional MEMS device, such as the DMD 100, is "stiction", which occurs when the yoke 114 rotates on the torsion hinges 118 and the yoke landing tips 116 come in physical contact with landing sites 120 located within the underlying bottom layer 106. In some cases, when surface adhesion forces are high enough, the yoke landing tips 116 may stick to the landing sites 120 in the underlying bottom layer 106, and thereby adversely affect the response time of the pixel mirror 108 and the overall device performance. In other cases, the landing tips 116 may adhere to the landing sites 120 and remain stuck if an applied mechanical restoring force is not strong enough to overcome the existing surface adhesion forces. The pixel mirror 108 will then be considered permanently defective because it will remain fixated at only one angle.

Stiction has heretofore been addressed by applying lubrication or passivation layers to the yoke landing tips 116 and the landing sites 120 in the hopes of making these metal surfaces slippery enough to minimize sticking. In addition, reset electronics 122 have been employed to pump additional electrical energy into the yoke 114 in order to help it break free from the constraining surface adhesion forces between the yoke landing tips 116 and the landing sites 120. These techniques require extra fabrication processes and additional cost.

Therefore, a need has arisen for a MEMS device which does not need special fabrication to overcome stiction forces.

BRIEF SUMMARY OF THE INVENTION

The present disclosure relates to a microelectromechanical device has a movable first electrode and stationary second and third electrodes oriented parallel with the substrate. The first electrode is separated from the substrate and includes a first hinge oriented parallel to the substrate, with spaced apart extensions extending from opposing sides of the first electrode. The second and third electrodes are fixedly formed on the substrate adjacent to the opposing sides of the first electrode and have spaced apart extensions interspersed with the spaced apart extensions of the first electrode. The first electrode can move substantially parallel to the surface of the substrate such that the extensions of one side of the first electrode substantially overlap the extensions of the second electrode in a first state and the extensions of the other side of the first electrode substantially overlaps the extensions of the third electrode in a second state. A second hinge has one or more first posts fixedly coupled to the substrate and one or more second posts coupled to the first electrode, such that movement of the first electrode causes a twisting of the first and second hinges.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
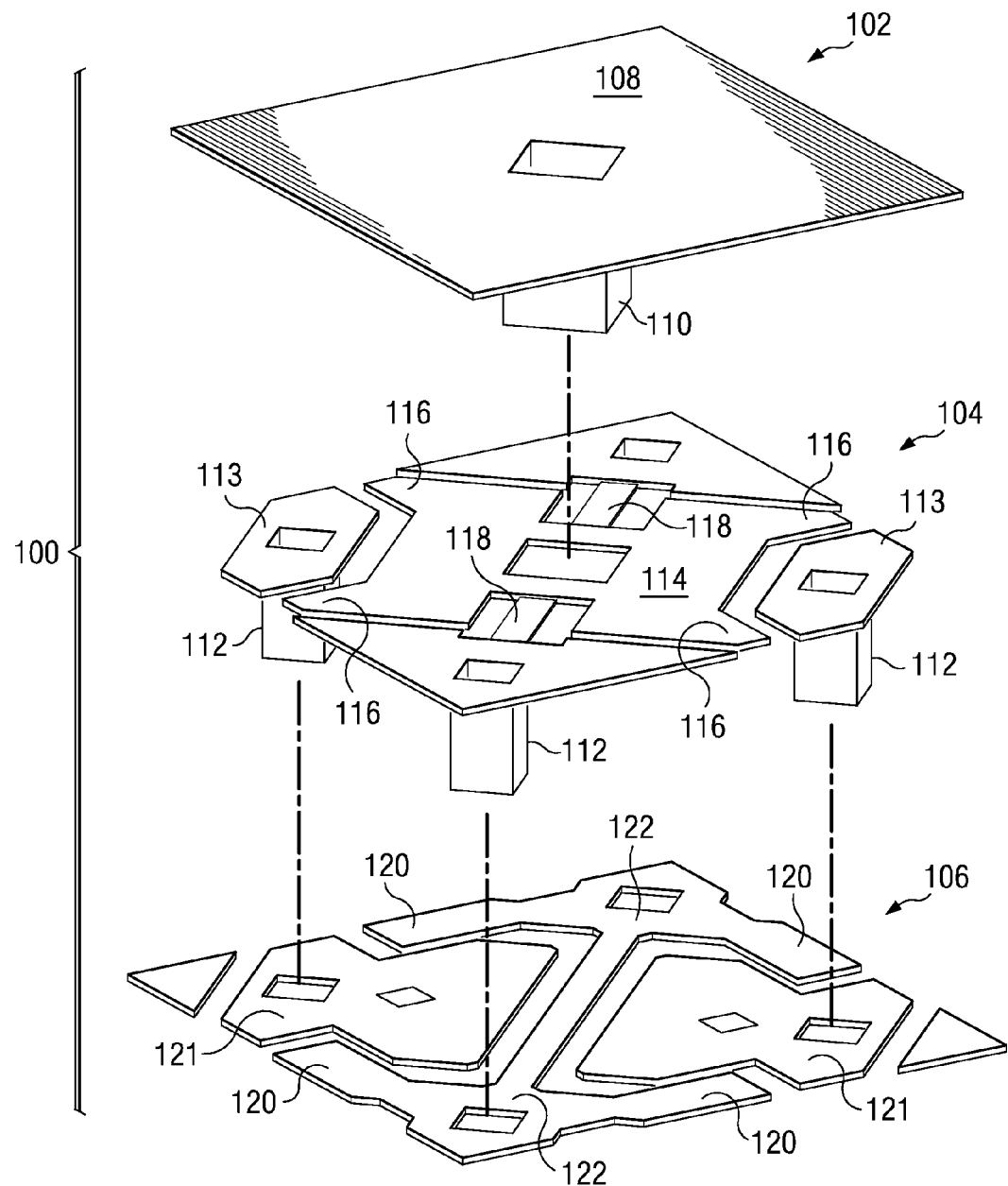
FIG. 1 is an exploded view of a prior-art digital micromirror device (DMD)
Figure 2:
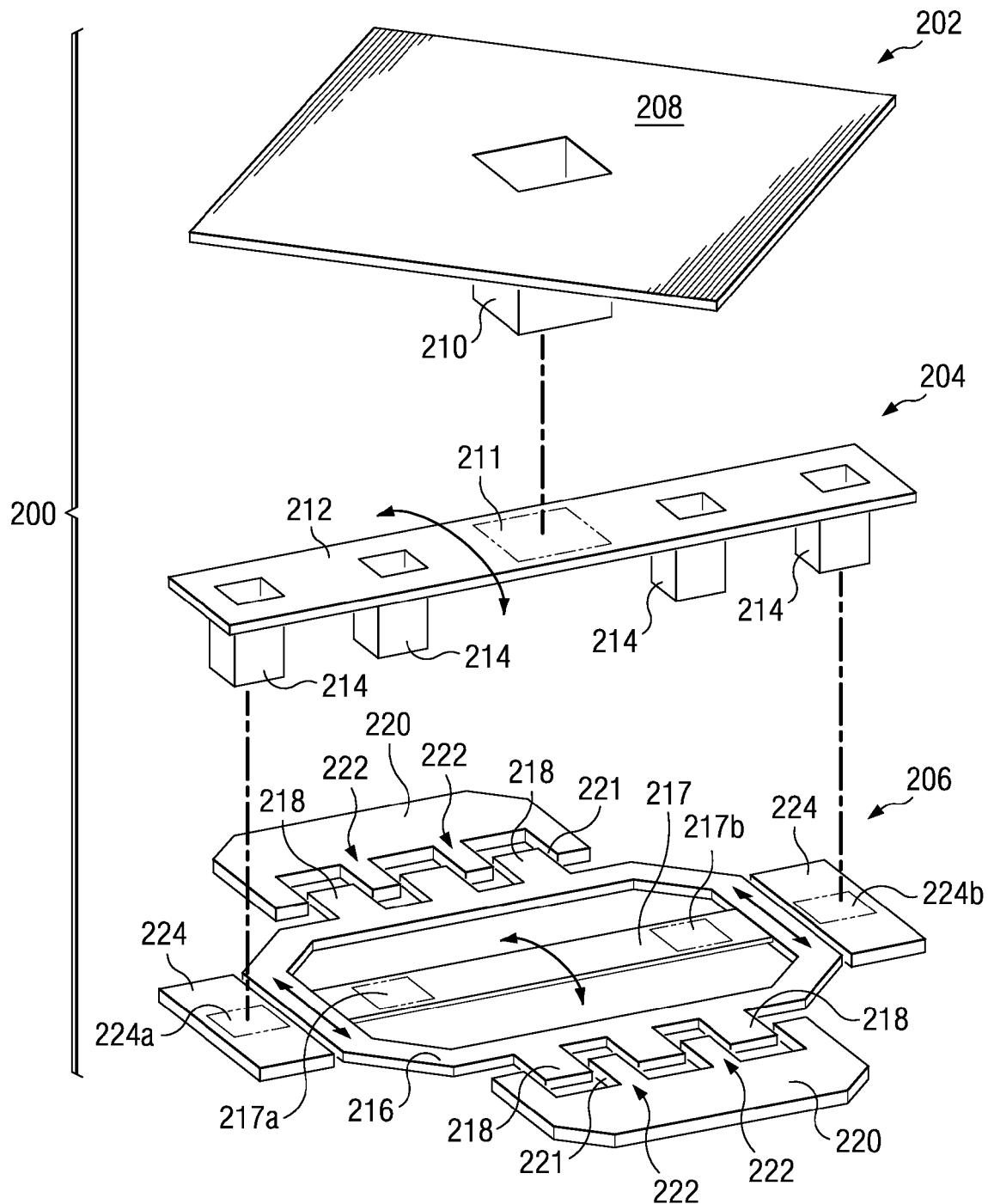
FIG. 2 is an exploded view of a DMD according to the present disclosure.
Figure 3:
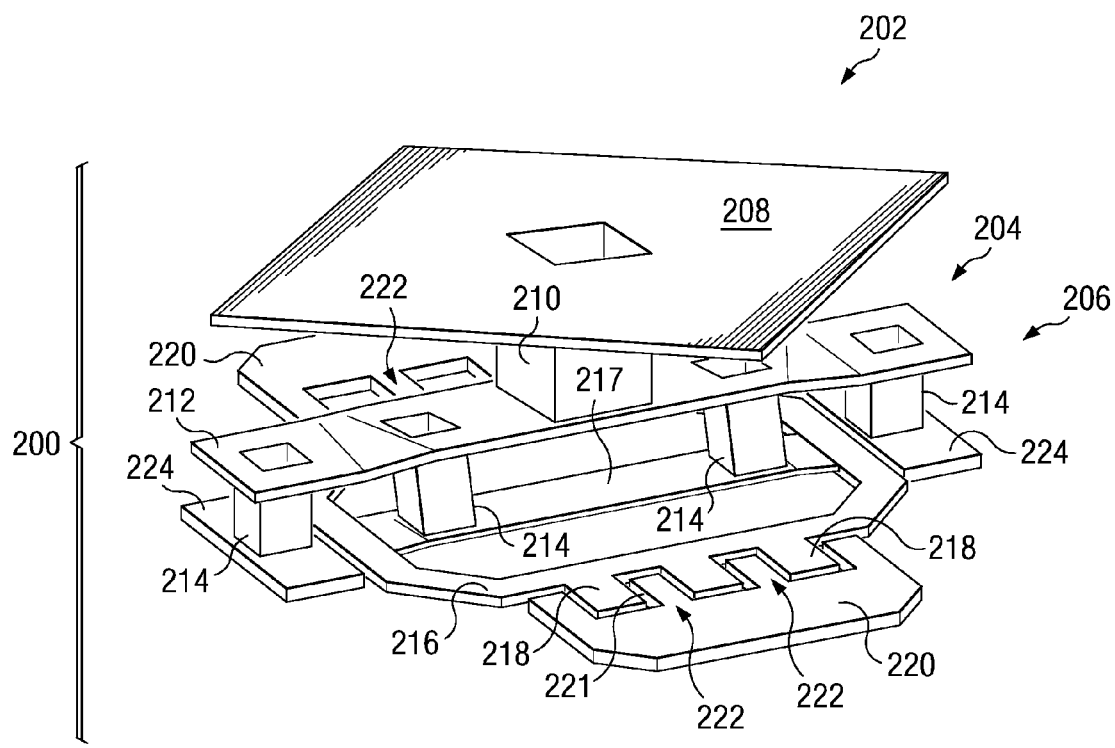
FIG. 3 shows the DMD with the mirror tilted.

The present invention is best understood in relation to FIGS. 1-3 of the drawings, like numerals being used for like elements of the various drawings.

Referring to the conventional digital micromirror device (DMD) of FIG. 1, the pixel mirror 108 tilts and rotates according to the tilt and rotation of the yoke. In practice, the pixel mirror 108 also rotates and tilts due to the electrostatic forces generated by the electric fields between the pixel mirror 108 and the mirror address electrodes 113, as well as the fields generated between the yoke 114 and the floating electrodes 121. Electrical signals are fed and carried through metal contact holes from the underlying integrated circuit (not shown).

Reference is now made to FIG. 2, which illustrates a digital micromirror device (DMD) 200 according to the present disclosure. The DMD 200 includes a top layer 202, a middle layer 204, and a bottom layer 206. As illustrated in the figure, the top layer 202 includes a pixel mirror 208 connected to a downwardly extending mirror support post 210. The mirror support post 210 is adapted for engagement with a corresponding post-attachment site 211 of primary torsion hinge 212 of the middle layer 204, as will be further described below. In some embodiments, the pixel mirror 208 has a thickness of about 2,000 to 5,000 Angstroms and is constructed of an aluminum composition using known methods and techniques. Preferably, the thickness of the pixel mirror 208 of the presently disclosed embodiment has a thickness of about 3,300 Angstroms. In addition to aluminum, other materials such as silicon oxide, silicon nitride, polysilicon, and phosphosilicate glass (PSG) may also be used in constructing the pixel mirror 208m with the mirror 208 covered with a reflective coating if needed. In some embodiments, the mirror support post 210 has a thickness of about 500 to 1,000 Angstroms and a height of 5000 to 25000 Angstroms and may be constructed of an aluminum alloy using known methods and techniques. The mirror support post 210 may also be formed of aluminum, titanium, and silicon metal alloys. Preferably, the thickness of the mirror support post 210 of the presently disclosed embodiment has a thickness of about 700 Angstroms and has a height of about 10000 Angstroms.

The middle layer 204, disposed beneath the top layer 202, includes a primary torsion hinge 212 supported by a plurality of primary hinge posts 214. The primary hinge posts 214 may be formed according to the same or similar materials and methods as the mirror support posts 210. Furthermore, the primary hinge posts 214 may also have the same or similar thickness as that of the mirror support post 210. The thickness of the primary hinge layer 212 is similar to the secondary hinge layer 217 (described below). While the primary hinge 212 is shown such in line with a diagonal through the center of mirror 208, the hinge 212 could also be aligned with a center parallel to either side of the mirror 208 (i.e., the mirror 208 could be rotated about the center of the post 210 such that it is deflected corner-to-corner or side-to-side, as desired).

The bottom layer 206, situated below the middle layer 204, includes a floating electrode 216 and mirror address electrodes 220. Floating electrode 216 includes secondary hinge 217 and extensions 218. Mirror address electrodes 220 flank either side of the floating electrode 216. Each mirror address electrode includes extensions 22 which interleave with extensions 218, separated by groove 221. The bottom layer 206 further includes contact pads 224, which are provided for receiving the primary hinge posts 214 at attachment sites 224a and 224b. The inner hinge posts 214 are attached at attachment sites 217a and 217b of secondary hinge 217. Electrical signals and connections from an integrated circuit (not shown) positioned beneath the bottom layer 206 are sent to the mirror address electrodes 220. The integrated circuit may be a static random access memory (SRAM) cell or an integrated complementary metal oxide semiconductor (CMOS) device. In other embodiments, the integrated circuit may be a multi-chip module (MCM) where many devices are assembled together by stacking one on top of another into a single module for faster electronic devices with added functionalities.

The floating electrode 216 is formed over a sacrificial masking layer, which is later removed, while the mirror address electrodes 220 and contact pads 224 are formed on the substrate. Once the sacrificial masking layer is removed, the floating electrode 216 is separated from the substrate, suspended by the primary torsion hinge 212 and posts 214. The floating electrode 216 can thus move laterally between the two mirror address electrodes, 220, as described in greater detail below.

The floating electrode 216 generally resides in a middle portion of the bottom layer 206 and is flanked by the two outer mirror address electrodes 220. Accordingly, the extensions 218, 222 are substantially interdigitated to form a comb-like structure. In some embodiments, the floating electrode 216 and the two mirror address electrodes 220 have a thickness of about 500 to about 3,000 Angstroms. Preferably, the thickness of the floating electrode 216 and the two mirror address electrodes 220 within the presently disclosed embodiment is about 1,500 Angstroms. Additionally, the interspersed extensions 218, 222 may have a corresponding width and length of about 20 µm and a thickness of about 500 to about 3,000 Angstroms. Still further, the spacing between the interspersed extensions 218, 222 can vary from about 5 to 10 µm. Preferably, the spacing between the interspersed extensions 218, 222 within the presently disclosed embodiment is about 7.5 µm. The thickness of the secondary hinge 217 is less than the thickness of the floating electrode and can range from 400 to 1500 Angstroms with a preferred thickness of about 600 Angstroms.

Although the interspersed extensions 218, 222 are depicted as being square in shape, they can take on a variety of polygonal shapes and sizes. For example, the interspersed extensions 218, 222 may be in the shape of a rectangle, a triangle, a parallelogram, a diamond, a trapezoid or any other suitable shape. In addition, the interspersed extensions 218, 222 may also take on plane-curve shapes such as circles, semi-circles, ellipses, semi-ellipses, lines, parabolas, or hyperbolas. Furthermore, the interspersed extensions 218, 222 may be uniformly spaced or non-uniformly spaced and uniform in shape and size or non-uniform in shape and size. Uniform and non-uniform combinations of shapes and sizes are also contemplated.

One benefit of the DMD 200 is realized through the amount of electrostatic force that can be generated between the extensions 218, 222. In particular, an electrostatic force F acting upon a charged object $Q_1$ as a result of the presence of another charged object $Q_2$ can be calculated by Coulomb's law ($F=k*Q_1*Q_2/d^2$), where k is a constant and d is the distance between the objects. The magnitude of a charged object Q can be calculated by multiplying the surface density $\sigma$ with the surface area of the charged object A ($Q=\sigma A$). Accordingly, the electrostatic force F scales proportionally with the surface area of the charged object A ($F\alpha A$). The interspersed extensions 218, 222 increase the surface area of the electrodes of the DMD 200, thereby facilitating the generation of a greater electrostatic force than that of a conventional DMD 100.

In practice, an electrostatic field is generated using the integrated circuit by pulsing a charge on one the mirror address electrodes 220 or, alternatively, pulsing both mirror address electrodes 220 with opposite charges. The floating electrode 216 is not pulsed by the integrated circuit. The charge (or charges) on the mirror address electrodes causes an electrostatic field which provide a pulling and/or pushing force on the floating electrode 216. Hence, the electrostatic field(s) between mirror address electrode(s) 220 and the floating electrode 216 causes the floating electrode 216 to travel toward one mirror address electrode 220 away from the other mirror address electrode 216. With the primary hinge 212 having its outer posts 214 attached to the stationary contact pads 224 and the inner posts 214 connected to the secondary hinge 217, which slides along the substrate along with the floating electrodes, the mirror 208 will rotate downward away from the attracting mirror address electrode and toward the repelling mirror address electrode 220. Both the secondary hinge 217 and primary torsion hinge 212 will twist responsive to the movement of the floating electrode 216 towards one of the mirror address electrodes 220. When the voltage is removed from mirror address electrodes 220 and the floating electrode 216, the secondary hinge 217 and primary torsion hinge 212 will untwist, returning the floating electrode to an intermediary position between the two mirror address electrodes.

Unlike a conventional DMD 100, wherein the pixel mirror 108 can experience stiction during tilting or rotation, the DMD 200 can generate much greater electrostatic forces thereby eliminating or at least reducing the chance that the pixel mirror 208 will stick to underlying layers of the DMD 200. In addition, the increased electrostatic force eliminates the need for reset electronics.

One of the advantages of the design of the DMD 200, is that thin film fabrication techniques may be used to produce a compact structure. For thin film fabrication techniques to be used, components of the devices that are formed by etching, such as the electrodes 216 and 220 and hinges 212 and 217, must be oriented in a plane parallel to the substrate—i.e., the thickness of the component must be much less than its width and length. A first material layer is used to form the contact pads, mirror address electrodes and floating electrodes (not including the secondary hinge 217). A mask layer is formed in the interior of the floating electrode and a material layer is formed over the mask layer to produce the secondary hinge with a thickness less than the thickness of the remainder of the floating electrode 216. A mask layer is formed over the components of the bottom layer 206, and the primary torsion hinge 212 is formed on top of the mask layer. Holes are formed through the primary torsion hinge 212 where the posts 214 are to be formed; the masking layer is etched through the holes to reach the attachment sites 217*a-b* and 224*a-b*. The posts 214 are formed by sputter deposition of the material into the holes; the posts 214 will form on the sidewalls of the masking layer beneath the holes.

Similarly, a masking layer is formed over the middle layer 204 and the mirrors 208 are formed over the masking layer. Again, the masking layer is etched through holes in the mirrors 208 where the posts 210 are to be formed; the masking layer is etched through the holes to the attachment sites 211. The posts 211 are formed by sputter depositions of the material into the holes. The masking layers can then be removed, leaving the structure shown in FIG. 2. In some embodiments, the hollow posts 210 may be filled in order to prevent unwanted reflections from the interior of the posts.

It should be noted that the components that have substantial height, i.e., the posts, are formed by deposition of a material over a sacrificial masking layer, not by deep etching.

Since the etched components are horizontally oriented (i.e., oriented such that the sides with the largest surface area are parallel to the surface of the substrate), deep etching is not required to form the hinges or electrodes. Deep etching, which would be needed for vertically oriented components, could not be reasonably used for metallic components, such as those formed from an aluminum composite material, and could cause odd geometries which would affect performance (such as hinges that are much thicker at the bottom than at the top, due to the longer etching times at the top of a material layer). Further, deep etching at the bottom level will cause unevenness at higher levels, which may prevent flat mirrors from being formed.

It will be appreciated by those of ordinary skill in the art that the invention can be embodied in other specific forms without departing from the spirit or essential character thereof. For example, the DMD 200 may be manufactured by surface micromachining, where the structures are built up in layers of thin film on the surface of a silicon wafer or any other suitable substrate. Another technique of manufacturing a DMD is bulk micromachining. In addition, the presently disclosed embodiments may also be applied to MEMS devices for useful applications in the study and understanding of biological proteins and gene functions. The presently disclosed embodiments are therefore considered in all respects to be illustrative and not restrictive. The scope of the invention is indicated by the appended claims rather than the foregoing description, and all changes that come within the meaning and ranges of equivalents thereof are intended to be embraced therein.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A microelectromechanical device, comprising:
a substrate;
a first electrode formed in a layer of a known thickness disposed on top of and separated from the substrate, said first electrode including a first hinge having a length and a width both substantially greater than the thickness of the layer, the first electrode having a plurality of spaced apart extensions extending from opposing sides of the first electrode, the spaced apart extensions defining a plurality of grooves interspersed with the extensions;
a pair of additional electrodes fixedly formed on the substrate adjacent to the opposing sides of the first electrode, the additional electrodes having a plurality of spaced apart extensions;
wherein the first electrode can move substantially parallel to the surface of the substrate such that the extensions of a first side of the first electrode substantially overlaps the extensions of one of the additional electrodes in a first state and the extensions of a second side of the first electrode substantially overlap the extensions of the other additional electrode in a second state; and
a second hinge having one or more first posts fixedly coupled to the substrate and one or more second posts coupled to the first electrode, such that movement of the first electrode between the additional electrodes causes a twisting of the first and second hinges.

2. The device of claim 1, wherein at least one of the plurality of extensions extending from each of the first electrode has a polygonal geometric shape.

3. The device of claim 2, wherein the polygonal geometric shape is selected from the group consisting of a triangle, a square, a rectangle, a parallelogram, a diamond, and a trapezoid.

4. The device of claim 1, wherein at least one of the plurality of extensions extending from the first electrode has a plane curve geometric shape.

5. The device of claim 4, wherein the plane curve geometric shape is selected from the group consisting of a circle, a semi-circle, an ellipse, a semi-ellipse, a line, a parabola, and a hyperbola.

6. The device of claim 1, wherein at least one of the plurality of extensions extending from the additional electrodes has a polygonal geometric shape.

7. The device of claim 6, wherein the polygonal geometric shape is selected from the group consisting of a triangle, a square, a rectangle, a parallelogram, a diamond, and a trapezoid.

8. the device of claim 1, wherein at least one of the plurality of extensions extending from the additional electrodes has a plane curve geometric shape.

9. The device of claim 8, wherein the plane curve geometric shape is selected from the group consisting of a circle, a semi-circle, an ellipse, a semi-ellipse, a line, a parabola, and a hyperbola.

10. The device of claim 1 and further comprising a mirror coupled to the second hinge.

11. The device of claim 1, further comprising a pixel mirror operatively secured to the second hinge such that the mirror is deflected as the hinge twists.

12. The device of claim 1 wherein the second hinge has a length and a width both substantially greater than its thickness.

13. A micro electromechanical device comprising:
   a substrate;
   a first electrode formed in a plane parallel to the surface of the substrate, the first electrode having at least one extension extending from a first portion of the first electrode;
   a first hinge connected to the first electrode and oriented parallel to the surface of the substrate;
   a second electrode supported by and spaced apart from the substrate substantially adjacent to the first portion of the first electrode, the second electrode having at least one extension extending towards the first electrode;
   a second hinge formed in a plane parallel to the substrate and attached to the first hinge by a support such that the first hinge is between the substrate and the second hinge;
   a second support between the first hinge and the second hinge; and
   a member supported by the second hinge by a third support such that the first and second supports are located on a first side of the second hinge and the third support is located on an opposite side of the second hinge offset from the first and second supports.

14. The device of claim 13, further comprising a member supported by the second hinge by a second support such that the second hinge is between the first hinge and the member.

* * * * *